United States Patent
Suda et al.

[11] 4,380,376
[45] Apr. 19, 1983

[54] ZOOM OBJECTIVE

[75] Inventors: Shigeyuki Suda, Ohashi; Kazuo Tanaka, Tokyo, both of Japan

[73] Assignee: Canon Kabushiki Kaisha, Tokyo, Japan

[21] Appl. No.: 159,492

[22] Filed: Jun. 16, 1980

[30] Foreign Application Priority Data

Jun. 18, 1979 [JP] Japan ................................. 54-76528

[51] Int. Cl.³ ........................................... G02B 15/18
[52] U.S. Cl. ..................................................... 350/427
[58] Field of Search ............................... 350/423, 427

[56] References Cited

U.S. PATENT DOCUMENTS 3,970,367  7/1976  Tsuji ..................................... 350/427

FOREIGN PATENT DOCUMENTS 1404284  5/1965  France ................................. 350/427
 282395  8/1962  Netherlands ......................... 350/427

*Primary Examiner*—John K. Corbin
*Assistant Examiner*—Scott J. Sugarman
*Attorney, Agent, or Firm*—Toren, McGeady and Stanger

[57] ABSTRACT

A zoom objective is composed of three components of which the first and the third each perform a one-round axial movement over the range of variation, while the second simultaneously performs a monotonic axial movement in one direction.

3 Claims, 14 Drawing Figures

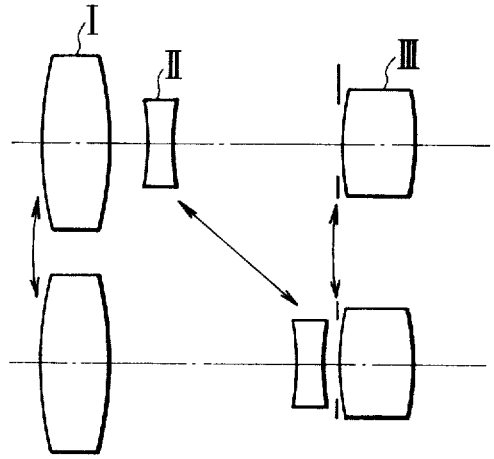
FIG. 1A
FIG. 1B
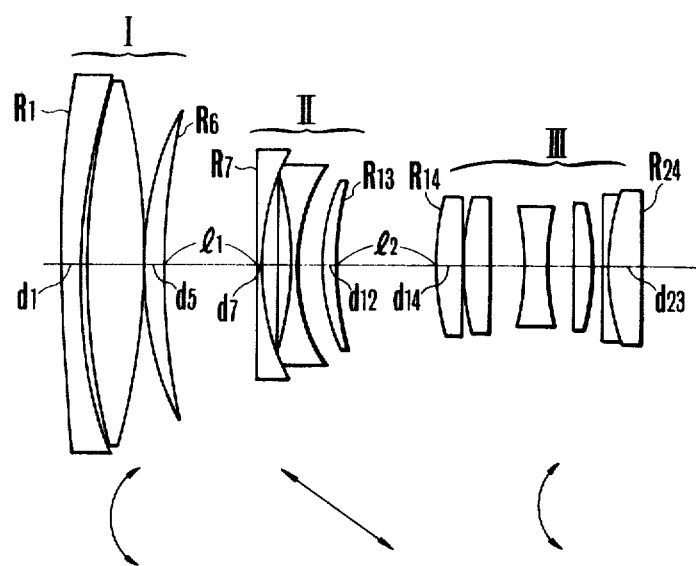
FIG. 2

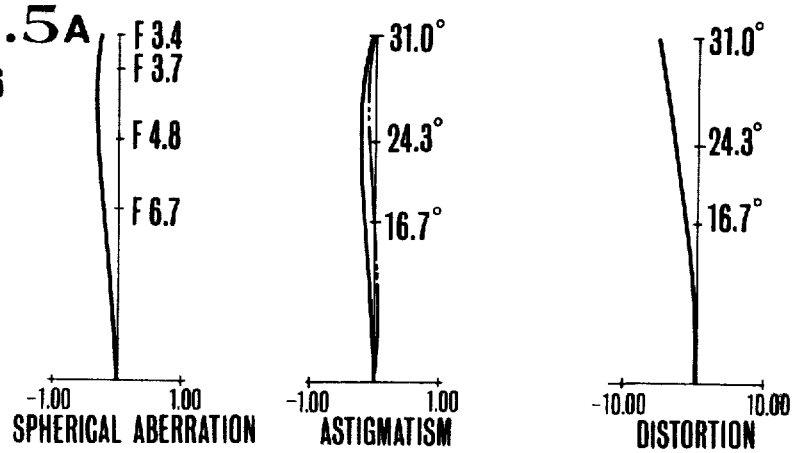
FIG.5A  f=36
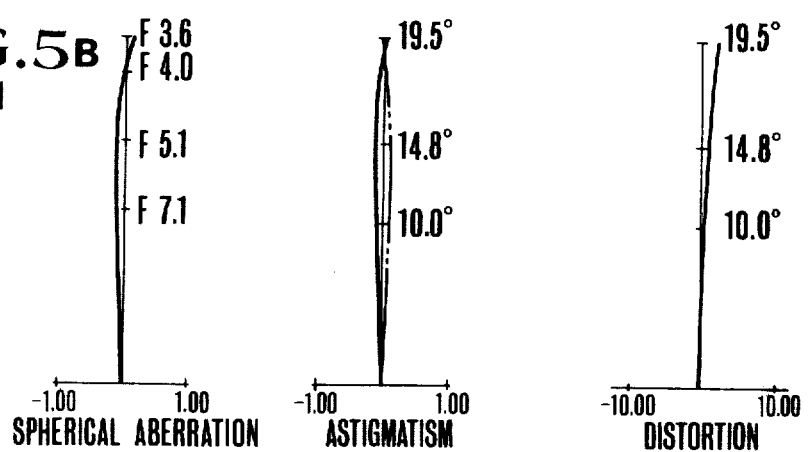
FIG.5B  f=61
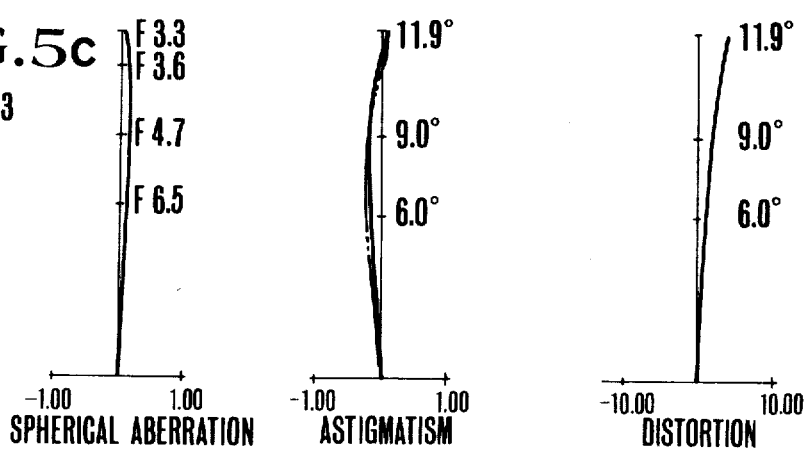
FIG.5C  f=103

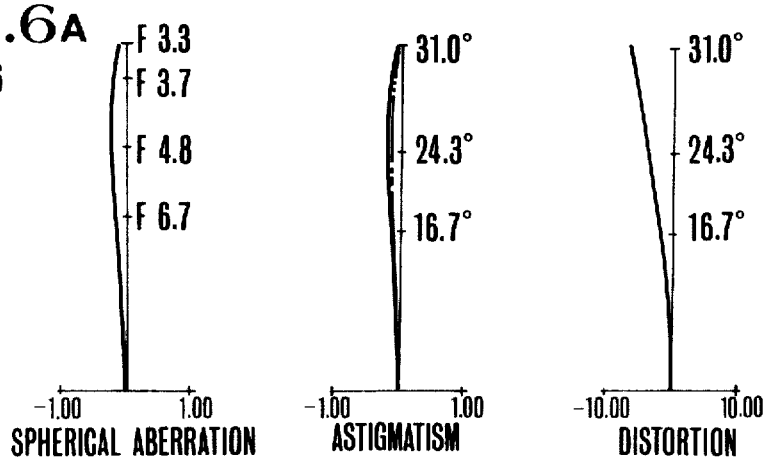
FIG.6A f=36
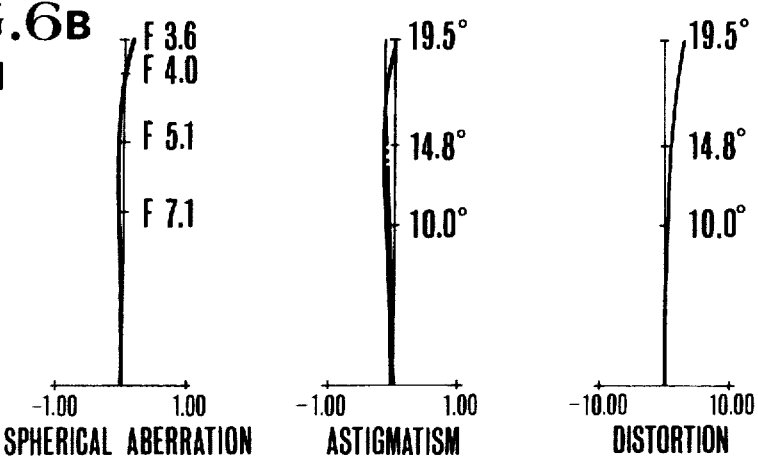
FIG.6B f=61
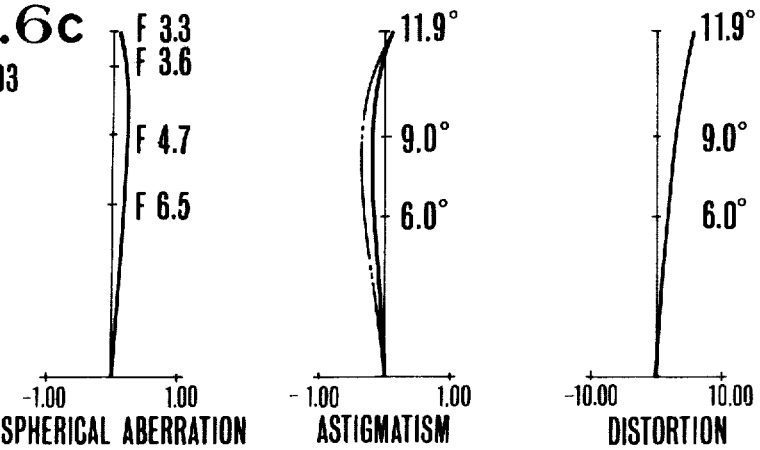
FIG.6C f=103

ZOOM OBJECTIVE

BACKGROUND OF THE INVENTION

This invention relates to mechanically-compensated compact zoom objectives having a large zoom ratio including a wide angle region and extending up to a telephoto region.

In a zoom objective lens system it is necessary to employ at least two lens components which move axially for varying the focal length of the entire system while maintaining a constant image plane. Recently there has been a desire to increase the zoom ratio of this type zoom objective while keeping the bulk and size to a minimum.

The zoom ratio of about two has been found practical in objectives for still cameras. Most of these objectives are constructed in the so-called short zoom form comprising two lens components of negative and positive powers as, for example, disclosed in U.S. Pat. Nos. 3,143,590, 3,848,969, 4,153,339, 4,142,779, and 4,147,410. Of these, there is known a lens system whose rear component having a positive power is divided into a plurality of parts to facilitate a remarkable increase in the zoom ratio. For example, U.S. Pat. No. 4,170,402 describes a system where the rear group comprises two positive lenses made movable independently of each other. In Japanese Patent Application Laid-Open No. Sho 53-34539, the rear group also is divided into three parts of positive, negative and positive powers of which the positive two are moved in unison with each other, while the intermediate or negative lens is moved in differential relation to the positive lenses. U.S. Pat. No. 3,771,853 describes the construction of a rear group of positive, negative and positive lenses which assume respectively different loci.

Aside from the direction of development of the art in the field of zoom objectives of the type consisting of negative and positive lens groups as described above, there is another direction of development toward an increase in the zoom ratio and the compactness based on the fundamental zoom lens design which has been widely accepted from. This development involves objectives comprising four lens components, namely, a focusing member, a variator, a compensator and a relay lens. For example, DOLS 2,833,308 describes a positive first lens group counting from the front, a negative second lens group and a positive third lens group constituting an entire system with exclusion of the relay lens. Here, the function of varying the focal length is imparted into the second and third lens groups, and both of the functions of focusing adjustment and image shift compensation are imparted into the first lens group. This achieves the objects of high zoom ratio and compactness.

To obtain a compact zoom objective of a high zoom ratio it is the common practice to strengthen the refractive power of the each individual movable lens group and narrow the air spacings between the successive lens groups. In this case, the following problems arise:

(1) The aberrational correction becomes difficult.

(2) The requirement for accuracy of adjustment in position of the movable lens group is extremely rigorous. If this is not fulfilled, the ideal optical performance cannot be obtained in completed objectives.

(3) No real solution can be found for the locus of movement of the compensator relative to the variator.

SUMMARY OF THE INVENTION

It is an object of the present invention to provide a compact zoom objective for a still camera having as high a zoom ratio as 3 with an angle of view of at least 60° in the shortest focal length positions and a total length (the distance from the front vertex to the focal plane) reduced to shorter than 1.5 times the longest focal length, while still achieving good correction of aberrations throughout the entire zooming range.

In a zoom objective according to the present invention a first lens group, a second lens group and a third lens group are arranged on a common optical axis from the front in the order stated, and the second lens group is imparted with the function of varying the size of an image of an object located at a fixed distance from the objective, the third lens group with the function of compensator, and the first lens group with not only the focusing function but also the function of a compensator, to accomplish the above-described object of the invention.

In other words, according to the present invention, as the bulk and size of the lens system is minimized by putting the second and third lens groups as near to each other as possible, in order to avoid the above-mentioned problem (3), the function of the compensator is added to the first lens group. In the zoom lens system of the present invention, therefore, when in zooming, the first and third lens groups are reciprocatingly moved along the optical axis, while the second lens group is simultaneously axially moved monotonically in one direction in the range of variation. And, the loci of movement of the first and third lens groups are made non-parallel to each other.

With the zoom lens system of the present invention when the above-described first lens has a positive refractive power, the second lens has a negative refractive power and the third lens has a positive refractive power, it the first and third lens groups preferably perform axial movements in one round of convex locus toward the front during the zooming. At that time, preferably the second lens group is axially moved monotonically from the front to the rear as the lens is zoomed from the wide angle to the telephoto settings.

BRIEF DESCRIPTION OF THE DRAWINGS

FIGS. 1A and 1B are schematic diagrams of an embodiment of a zoom objective lens system according to the present invention in two operative positions.

FIG. 2, FIG. 3 and FIG. 4 are sectional views showing three different examples of specific zoom objectives according to the present invention.

FIGS. 5A to 5C are graphic representations of the various aberrations of the zoom objective of FIG. 2 in the shortest, middle and longest focal length positions respectively.

FIGS. 6A to 6C are similar graphs of the objective of FIG. 3.

DESCRIPTION OF THE PREFERRED EMBODIMENTS

FIGS. 1A and 1B are block diagrams of a zoom objective of the present invention. In FIG. 1A, the lens components are positioned the wide angle end of a zooming range and in FIG. 1B at the telephoto end thereof.

The lens system of FIG. 1 is constructed with three groups as a whole of which the first I counting from the front is of positive power, the second II of negative power and the third III of positive power. When zooming, the second lens group II is moved toward the first lens group I in the wide angle settings, and toward the third lens group III in the telephoto settings. Along with this, the first lens group I and the third lens group III each perform an axial movement of small range in one round of non-parallel and convex locus toward the front. Thus, the focal length of the entire system is varied throughout the range of axial movement of the lens groups while still maintaining a fixed focal plane throughout the entire range. This makes it possible to facilitate an extreme minimization of the bulk and size of the entire system and to increase the zoom ratio up to about 3 with the inclusion of a wide angle position at one end of a zooming range, the opposite end of which is extended up to produce a telephoto effect. In more detail, as the air spacings between the successive lens groups are shorter, the use of only the third lens group as the compensator for the variator of the second lens group II would lead to give rise to the above-described problem (3). But by using two compensators of the first and third lens groups I and III the equation for defining the movements of the individual zoom lens groups can be solved. Moreover, the refractive power of each of the lens groups may be weakened, and the aberrational problem is simplified. Further, as the first lens group serves as a focusing member, the entire system can be minimized to a compact size.

Figure 3:
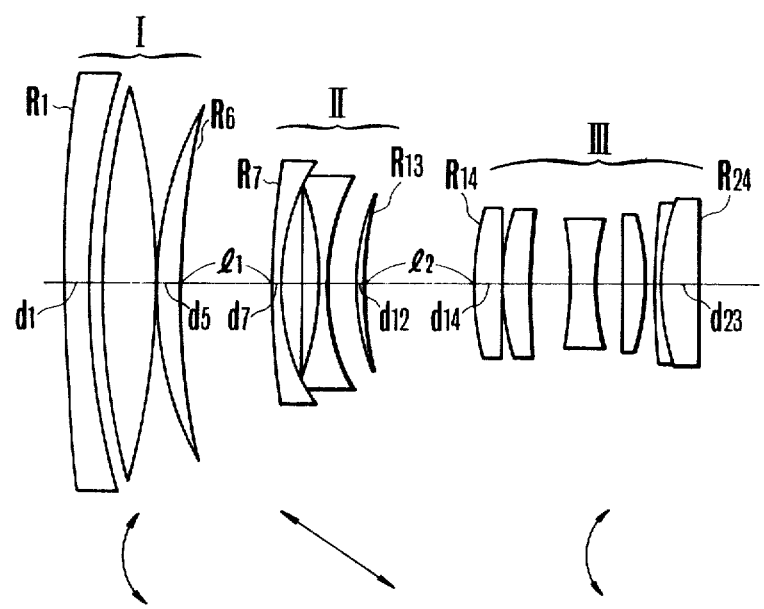
Figure 4:
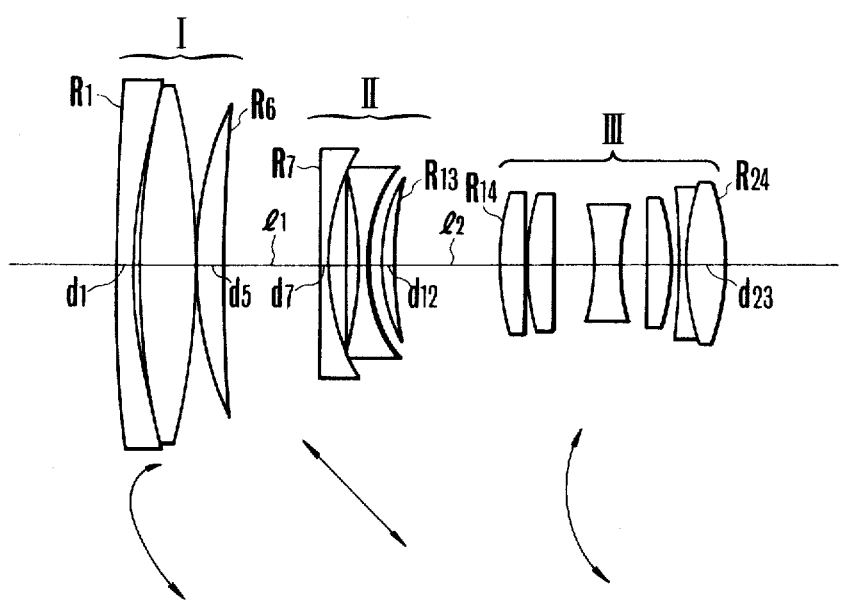

FIGS. 2 to 4 are longitudinal sections of embodiments of the zoom lens system of FIG. 1 with FIG. 2 showing Example 1, FIG. 3 Example 2, and FIG. 4 Example 3. The zoom objectives shown in Examples 1 to 3 have a range of variation of the focal length, f, between 36 mm and 103 mm, with a zoom ratio of about 2.9 and an F-number of 3.5.

The numerical data of the zoom objectives shown in Examples 1 to 3 for the radii of curvature, Ri, the axial thicknesses or axial air separations, di, the refractive indices, ni, for the spectral d line, and the Abbe numbers, $\nu i$, are given in Tables 1-1 to 3-1 below. The lens block separations l1 and l2 and back focus of each of the zoom objectives shown in Examples 1 to 3 during zooming with object at infinity are given in Tables 1-2 to 3-2.

Figure 7A:
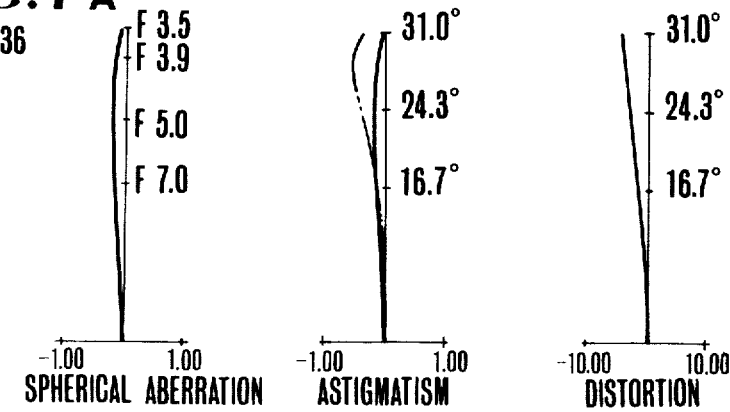
FIGS. 7A to 7C are similar graphs of the objective of FIG. 4.
Figure 7B:
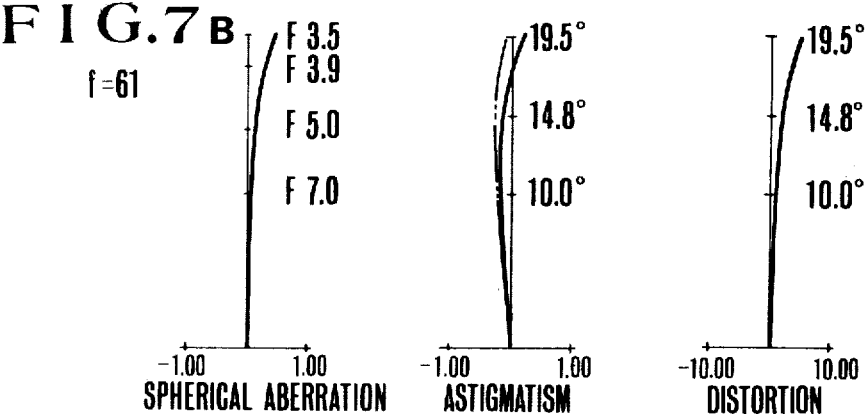
Figure 7C:
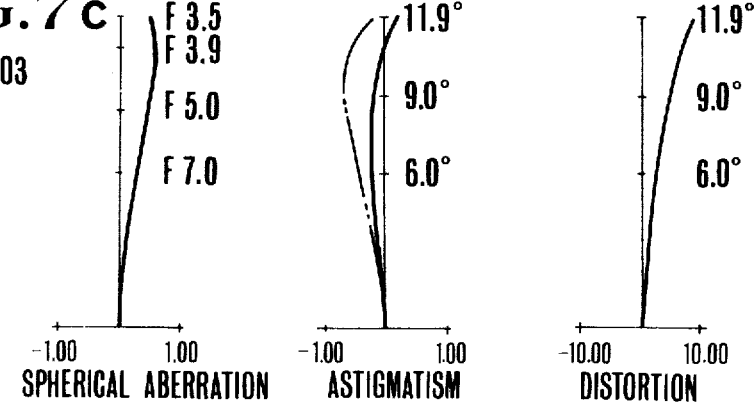

Further, the various aberrations of the zoom objective of Example 1 in three different focal length positions are shown in FIGS. 5A to 5C, those of the zoom objective of Example 2 in FIGS. 6A to 6C, and those of the zoom objective of Example 3 in FIGS. 7A to 7C.

Example 1 (FIG. 2)

TABLE 1-1

| Radius of Curvature | | Thickness & Separation | | Refractive Index | | Abbe Number | |
|---|---|---|---|---|---|---|---|
| $R_1$ | 262.97106 | $d_1$ | 2.50 | $n_1$ | 1.80518 | $\nu_1$ | 25.4 |
| $R_2$ | 77.86633 | $d_2$ | 0.82 | | | | |
| $R_3$ | 81.68581 | $d_3$ | 8.15 | $n_2$ | 1.62041 | $\nu_2$ | 60.3 |
| $R_4$ | −233.25481 | $d_4$ | 0.15 | | | | |
| $R_5$ | 50.93572 | $d_5$ | 4.21 | $n_3$ | 1.65160 | $\nu_3$ | 58.6 |
| $R_6$ | 168.84094 | $l_1$ | | | | | |
| $R_7$ | 410.39580 | $d_7$ | 1.00 | $n_4$ | 1.78590 | $\nu_4$ | 44.2 |
| $R_8$ | 33.49766 | $d_8$ | 2.50 | | | | |
| $R_9$ | 165.71959 | $d_9$ | 2.48 | $n_5$ | 1.80518 | $\nu_5$ | 25.4 |
| $R_{10}$ | −58.57077 | $d_{10}$ | 0.7 | $n_6$ | 1.78590 | $\nu_6$ | 44.2 |
| $R_{11}$ | 23.56871 | $d_{11}$ | 4.36 | | | | |
| $R_{12}$ | 27.80333 | $d_{12}$ | 2.32 | $n_7$ | 1.80518 | $\nu_7$ | 25.4 |
| $R_{13}$ | 53.31014 | $l_2$ | | | | | |

TABLE 1-1-continued

| Radius of Curvature | | Thickness & Separation | | Refractive Index | | Abbe Number | |
|---|---|---|---|---|---|---|---|
| $R_{14}$ | 40.56176 | $d_{14}$ | 4.0 | $n_8$ | 1.62041 | $\nu_8$ | 60.3 |
| $R_{15}$ | 530.29479 | $d_{15}$ | 0.15 | | | | |
| $R_{16}$ | 33.64676 | $d_{16}$ | 4.43 | $n_9$ | 1.62041 | $\nu_9$ | 60.3 |
| $R_{17}$ | 165.70311 | $d_{17}$ | 5.69 | | | | |
| $R_{18}$ | −52.11176 | $d_{18}$ | 4.09 | $n_{10}$ | 1.66680 | $\nu_{10}$ | 33.0 |
| $R_{19}$ | 29.61205 | $d_{19}$ | 3.91 | | | | |
| $R_{20}$ | 164.83944 | $d_{20}$ | 3.41 | $n_{11}$ | 1.62299 | $\nu_{11}$ | 58.2 |
| $R_{21}$ | −33.92492 | $d_{21}$ | 1.17 | | | | |
| $R_{22}$ | 150.08264 | $d_{22}$ | 1.20 | $n_{12}$ | 1.60342 | $\nu_{12}$ | 38.0 |
| $R_{23}$ | 31.49986 | $d_{23}$ | 5.78 | $n_{13}$ | 1.69680 | $\nu_{13}$ | 55.5 |
| $R_{24}$ | −412.30446 | | | | | | |

TABLE 1-2

| | f = 36 | f = 61 | f = 103 |
|---|---|---|---|
| $l_1$ | 0.007 | 15.007 | 33.007 |
| $l_2$ | 32.809 | 16.292 | 1.082 |
| Back Focus | 52.573 | 58.090 | 50.300 |

Example 2 (FIG. 3)

TABLE 2-1

| Radius of Curvature | | Thickness & Separation | | Refractive Index | | Abbe Number | |
|---|---|---|---|---|---|---|---|
| $R_1$ | 242.74901 | $d_1$ | 2.50 | $n_1$ | 1.80518 | $\nu_1$ | 25.4 |
| $R_2$ | 74.19608 | $d_2$ | 1.78 | | | | |
| $R_3$ | 76.45520 | $d_3$ | 7.64 | $n_2$ | 1.61800 | $\nu_2$ | 63.4 |
| $R_4$ | −191.93288 | $d_4$ | 0.15 | | | | |
| $R_5$ | 46.17825 | $d_5$ | 4.10 | $n_3$ | 1.65160 | $\nu_3$ | 58.6 |
| $R_6$ | 104.75431 | $l_1$ | | | | | |
| $R_7$ | 224.21886 | $d_7$ | 1.00 | $n_4$ | 1.78590 | $\nu_4$ | 44.2 |
| $R_8$ | 129.90925 | $d_8$ | 2.61 | | | | |
| $R_9$ | 122.22262 | $d_9$ | 3.50 | $n_5$ | 1.80518 | $\nu_5$ | 25.4 |
| $R_{10}$ | −39.06172 | $d_{10}$ | 0.7 | $n_6$ | 1.88300 | $\nu_6$ | 40.8 |
| $R_{11}$ | 27.36909 | $d_{11}$ | 4.81 | | | | |
| $R_{12}$ | 32.70868 | $d_{12}$ | 1.65 | $n_7$ | 1.84666 | $\nu_7$ | 23.9 |
| $R_{13}$ | 72.39283 | $l_2$ | | | | | |
| $R_{14}$ | 38.52506 | $d_{14}$ | 4.00 | $n_8$ | 1.61800 | $\nu_8$ | 63.4 |
| $R_{15}$ | 320.61760 | $d_{15}$ | 0.15 | | | | |
| $R_{16}$ | 30.50763 | $d_{16}$ | 4.43 | $n_9$ | 1.61800 | $\nu_9$ | 63.4 |
| $R_{17}$ | 113.36060 | $d_{17}$ | 5.82 | | | | |
| $R_{18}$ | −65.66310 | $d_{18}$ | 4.09 | $n_{10}$ | 1.69895 | $\nu_{10}$ | 30.1 |
| $R_{19}$ | 28.16587 | $d_{19}$ | 4.04 | | | | |
| $R_{20}$ | 8990.92661 | $d_{20}$ | 3.41 | $n_{11}$ | 1.62041 | $\nu_{11}$ | 60.3 |
| $R_{21}$ | −33.31840 | $d_{21}$ | 1.17 | | | | |
| $R_{22}$ | 53.60101 | $d_{22}$ | 1.20 | $n_{12}$ | 1.59270 | $\nu_{12}$ | 35.3 |
| $R_{23}$ | 33.95955 | $d_{23}$ | 5.78 | $n_{13}$ | 1.69680 | $\nu_{13}$ | 55.5 |
| $R_{24}$ | 223.72286 | | | | | | |

TABLE 2-2

| | f = 36 | f = 61 | f = 103 |
|---|---|---|---|
| $l_1$ | 0.277 | 15.277 | 33.277 |
| $l_2$ | 32.7848 | 16.267 | 1.058 |
| Back Focus | 51.540 | 57.058 | 49.267 |

Example 3 (FIG. 4)

TABLE 3-1

| Radius of Curvature | | Thickness & Separation | | Refractive Index | | Abbe Number | |
|---|---|---|---|---|---|---|---|
| $R_1$ | 328.38416 | $d_1$ | 2.50 | $n_1$ | 1.80518 | $\nu_1$ | 25.4 |
| $R_2$ | 81.80170 | $d_2$ | 0.82 | | | | |
| $R_3$ | 95.53598 | $d_3$ | 8.02 | $n_2$ | 1.62041 | $\nu_2$ | 60.3 |
| $R_4$ | −183.65376 | $d_4$ | 0.15 | | | | |
| $R_5$ | 51.85476 | $d_5$ | 4.83 | $n_3$ | 1.65160 | $\nu_3$ | 58.6 |
| $R_6$ | 203.13189 | $l_1$ | | | | | |
| $R_7$ | 596.67526 | $d_7$ | 1.00 | $n_4$ | 1.78590 | $\nu_4$ | 44.2 |
| $R_8$ | 31.43494 | $d_8$ | 3.03 | | | | |
| $R_9$ | 198.67344 | $d_9$ | 2.16 | $n_5$ | 1.80518 | $\nu_5$ | 25.4 |
| $R_{10}$ | −84.98376 | $d_{10}$ | 0.70 | $n_6$ | 1.78590 | $\nu_6$ | 44.2 |
| $R_{11}$ | 22.19917 | $d_{11}$ | 2.41 | | | | |

TABLE 3-1-continued

| Radius of Curvature | | Thickness & Separation | | Refractive Index | | Abbe Number | |
|---|---|---|---|---|---|---|---|
| $R_{12}$ | 25.11164 | $d_{12}$ | 2.46 | $n_7$ | 1.80518 | $\nu_7$ | 25.4 |
| $R_{13}$ | 63.75892 | $l_2$ | | | | | |
| $R_{14}$ | 40.94271 | $d_{14}$ | 4.05 | $n_8$ | 1.62041 | $\nu_8$ | 60.3 |
| $R_{15}$ | −480.44814 | $d_{15}$ | 0.15 | | | | |
| $R_{16}$ | 35.60846 | $d_{16}$ | 4.43 | $n_9$ | 1.62041 | $\nu_9$ | 60.3 |
| $R_{17}$ | −231.79195 | $d_{17}$ | 5.69 | | | | |
| $R_{18}$ | −39.29927 | $d_{18}$ | 4.09 | $n_{10}$ | 1.66680 | $\nu_{10}$ | 33.0 |
| $R_{19}$ | 26.19201 | $d_{19}$ | 3.91 | | | | |
| $R_{20}$ | 1213.80872 | $d_{20}$ | 3.41 | $n_{11}$ | 1.62299 | $\nu_{11}$ | 58.2 |
| $R_{21}$ | −45.00678 | $d_{21}$ | 1.17 | | | | |
| $R_{22}$ | −94.99096 | $d_{22}$ | 1.2 | $n_{12}$ | 1.60342 | $\nu_{12}$ | 38.0 |
| $R_{23}$ | 36.59736 | $d_{23}$ | 5.78 | $n_{13}$ | 1.69680 | $\nu_{13}$ | 55.5 |
| $R_{24}$ | −37.05299 | | | | | | |

TABLE 3-2

| | f = 36 | f = 61 | f = 103 |
|---|---|---|---|
| $l_1$ | 0.150 | 15.150 | 33.150 |
| $l_2$ | 32.612 | 16.095 | 0.885 |
| Back Focus | 50.804 | 56.322 | 48.531 |

What is claimed is:

1. A zoom objective comprising:

a first lens group, a second lens group and a third lens group arranged in the order mentioned from an objective end to an image end;

said first lens group having a positive refractive power and being axially movable forward and then rearward when zooming from a wide angle to a telephoto setting;

said second lens group having a negative refractive power and being axially movable from the objective end to the image end when zooming from the wide angle to the telephoto setting; and said third lens group having a positive refractive power and being axially movable forward and then rearward when zooming from the wide angle to the telephoto setting.

2. A zoom objective as described in claim 1, wherein the locus of movement of said first lens group and the locus of movement of said third lens group are non-parallel to each other during zooming.

3. A zoom objective comprising:

a first lens group, a second lens group, and a third lens group arranged in the order mentioned from an objective end to an image end;

said first lens group having a positive refractive power and focusing and compensating functions, and moving first toward the objective end and then toward the image end during zooming from a wide angle position to a tele position;

said second lens group having a negative refractive power and magnificating function, and moving only in one direction from the objective end to the image end during zooming from the wide angle position to the tele position; and said third lens group having a positive refractive power and compensating function, and moving first toward the objective end and then to the image surface end during zooming from the wide angle position to the tele position.

* * * * *